US012118295B2

(12) United States Patent
Aggarwal et al.

(10) Patent No.: US 12,118,295 B2
(45) Date of Patent: Oct. 15, 2024

(54) TEXT SIMPLIFICATION WITH MINIMAL HALLUCINATION

(71) Applicant: ADOBE INC., San Jose, CA (US)

(72) Inventors: Vinay Aggarwal, New Delhi (IN); Aparna Garimella, Telangana (IN); Ananya Ganesh, Chennai (IN); Niyati Himanshu Chhaya, Telangana (IN); Nandakishore Kambhatla, Bangalore (IN)

(73) Assignee: ADOBE INC., San Jose, CA (US)

( * ) Notice: Subject to any disclaimer, the term of this patent is extended or adjusted under 35 U.S.C. 154(b) by 91 days.

(21) Appl. No.: 18/045,551

(22) Filed: Oct. 11, 2022

(65) Prior Publication Data
US 2024/0119220 A1 Apr. 11, 2024

(51) Int. Cl.
*G06F 17/00* (2019.01)
*G06F 40/166* (2020.01)
*G06F 40/289* (2020.01)
*G06F 40/30* (2020.01)
*G06N 3/082* (2023.01)

(52) U.S. Cl.
CPC .......... *G06F 40/166* (2020.01); *G06F 40/289* (2020.01); *G06F 40/30* (2020.01); *G06N 3/082* (2013.01)

(58) Field of Classification Search
CPC ...... G06F 40/166; G06F 40/289; G06F 40/30; G06N 3/082; G06N 3/08; G06N 3/045
See application file for complete search history.

(56) References Cited

U.S. PATENT DOCUMENTS

| 11,030,517 | B2 * | 6/2021 | Wang | G06F 40/56 |
| 11,232,266 | B1 * | 1/2022 | Biswas | G06F 40/35 |
| 2016/0299881 | A1 * | 10/2016 | Gupta | G06F 40/40 |
| 2017/0323204 | A1 * | 11/2017 | Akbulut | G06F 16/3329 |
| 2018/0260472 | A1 * | 9/2018 | Kelsey | G06F 40/56 |
| 2019/0370336 | A1 * | 12/2019 | Prakash | G06F 40/40 |

(Continued)

OTHER PUBLICATIONS

Ladhak, Faisal, et al. "Faithful or extractive? on mitigating the faithfulness-abstractiveness trade-off in abstractive summarization." arXiv preprint arXiv:2108.13684 (2021) (Year: 2021).*

(Continued)

*Primary Examiner* — Andrew T McIntosh
(74) *Attorney, Agent, or Firm* — F. CHAU & ASSOCIATES, LLC

(57) ABSTRACT

Systems and methods for text simplification are described. Embodiments of the present disclosure identify a simplified text that includes original information from a complex text and additional information that is not in the complex text. Embodiments then compute an entailment score for each sentence of the simplified text using a neural network, wherein the entailment score indicates whether the sentence of the simplified text includes information from a sentence of the complex text corresponding to the sentence of the simplified text. Then, embodiments generate a modified text based on the entailment score, the simplified text, and the complex text, wherein the modified text includes the original information and excludes the additional information. Embodiments may then present the modified text to a user via a user interface.

19 Claims, 11 Drawing Sheets

(56) References Cited

U.S. PATENT DOCUMENTS

| | | | | |
|---|---|---|---|---|
| 2020/0133968 | A1* | 4/2020 | Bohannon | G06F 40/30 |
| 2021/0056150 | A1* | 2/2021 | Karandish | G06F 16/3329 |
| 2021/0073480 | A1* | 3/2021 | Mehta | G06F 40/51 |
| 2021/0117617 | A1* | 4/2021 | Blaya | G06F 40/253 |
| 2021/0192277 | A1* | 6/2021 | Andrade Silva | G06N 3/045 |
| 2021/0342377 | A1* | 11/2021 | Galle | G06N 3/045 |
| 2021/0357586 | A1* | 11/2021 | Archuleta | G06F 40/30 |
| 2022/0067285 | A1* | 3/2022 | Sellam | G06F 40/205 |
| 2022/0067309 | A1* | 3/2022 | Sellam | G06F 18/2178 |
| 2023/0063713 | A1* | 3/2023 | Lukyanenko | G06F 16/345 |
| 2023/0070497 | A1* | 3/2023 | McInerney | G06F 40/30 |
| 2023/0119109 | A1* | 4/2023 | Choubey | G06F 18/2155 |
| | | | | 706/12 |
| 2023/0146979 | A1* | 5/2023 | Gunasekara | G06F 16/345 |
| | | | | 704/9 |
| 2023/0252225 | A1* | 8/2023 | Zhelezniak | G06N 5/01 |
| | | | | 715/254 |
| 2023/0259544 | A1* | 8/2023 | Sotudeh Gharebagh | |
| | | | | G06F 16/345 |
| | | | | 704/9 |
| 2023/0259705 | A1* | 8/2023 | Tunstall-Pedoe | G06N 5/01 |
| | | | | 704/9 |
| 2023/0325606 | A1* | 10/2023 | Mahendravarman | |
| | | | | G06F 16/951 |
| | | | | 704/9 |
| 2023/0376677 | A1* | 11/2023 | Choubey | G06N 3/045 |
| 2023/0419017 | A1* | 12/2023 | Fabbri | G06F 40/284 |
| 2023/0419051 | A1* | 12/2023 | Sabapathy | G06F 40/247 |
| 2024/0061874 | A1* | 2/2024 | Arslan | G06N 20/00 |
| 2024/0078380 | A1* | 3/2024 | Madhusudhan | G06F 40/216 |

OTHER PUBLICATIONS

Zhao, Zheng, Shay B. Cohen, and Bonnie Webber. "Reducing quantity hallucinations in abstractive summarization." arXiv preprint arXiv:2009.13312 (2020) (Year: 2020).*

Cao, Meng, Yue Dong, and Jackie Chi Kit Cheung. "Hallucinated but factual! inspecting the factuality of hallucinations in abstractive summarization." arXiv preprint arXiv:2109.09784 (2021) (Year: 2021).*

Filippova, Katja. "Controlled hallucinations: Learning to generate faithfully from noisy data." arXiv preprint arXiv:2010.05873 (2020) (Year: 2020).*

Maynez, Joshua, et al. "On faithfulness and factuality in abstractive summarization." arXiv preprint arXiv:2005.00661 (2020) (Year: 2020).*

Guo, et al., "Dynamic Multi-Level Multi-Task Learning for Sentence Simplification", Proceedings of the 27th International Conference on Computational Linguistics, pp. 462-476, Aug. 20-26, 2018.

Liu, et al., "RoBERTa: A Robustly Optimized BERT Pretraining Approach", arXvi preprint: arXiv:1907.11692v1 [cs.CL] Jul. 26, 2019, 13 pages.

Williams, et al., "A Broad-Coverage Challenge Corpus for Sentence Understanding through Inference", arXiv preprint: arXiv:1704.05426v4 [cs.CL] Feb. 19, 2018, 11 pages.

Laban, et al., "Keep it Simple: Unsupervised Simplification of Multi-Paragraph Text", arXiv preprint: arXiv:2107.03444v1 [cs.CL] Jul. 7, 2021, 14 pages.

Martin, et al., "Controllable Sentence Simplification", arXiv preprint: arXiv:1910.02677v3 [cs.CL] Apr. 20, 2020, 10 pages.

* cited by examiner

TEXT SIMPLIFICATION WITH MINIMAL HALLUCINATION

BACKGROUND

The following relates to natural language processing. Natural language processing (NLP) refers to the use of a computer to edit or generate language information. NLP may be used to generate transcripts from audio, determine intents from user queries and content, generate labels for various media, and the like. NLP methods often utilize one or more neural networks. In such cases, the neural networks can be trained in various ways, including supervised and unsupervised methods.

Recently, NLP techniques have been used to convert complex texts into simplified texts. For example, some NLP techniques break up larger sentences into shorter sentences, and substitute complex (e.g., less commonly used) vocabulary for more common vocabulary. However, these simplification methods can generate content that wasn't in the original (i.e., hallucinations). For example, hallucinations can include new and or inconsistent information with respect to the original text. Such inconsistent information can carry significant consequences in areas such as legal documents and medical documents. Accordingly, there is a need in the art for systems and methods for text simplification that simplify text without hallucinations.

SUMMARY

The present disclosure describes systems and methods for generating simplified text based on a complex text while reducing hallucinations. Embodiments include a text simplification apparatus configured to generate the simplified text and remove the hallucinations. The text simplification apparatus includes a text simplification component which generates the text, and a pruning component which removes the hallucinations from the simplified text to produce a modified text, which is then presented to a user via a user interface. The pruning component includes a neural network which is trained to compute an "entailment score" of the simplified text with respect to the complex text. The entailment score is a measure of how well the simplified text follows the complex text, and is determined by several different factors which are considered within the neural network.

A method, apparatus, non-transitory computer readable medium, and system for text simplification of complex domain-specific text are described. One or more aspects of the method, apparatus, non-transitory computer readable medium, and system include identifying a simplified text that includes original information from a complex text and additional information that is not in the complex text; computing an entailment score for each sentence of the simplified text using a neural network, wherein the entailment score indicates whether the sentence of the simplified text includes information from a sentence of the complex text corresponding to the sentence of the simplified text; and generating a modified text based on the entailment score, the simplified text, and the complex text, wherein the modified text includes the original information and excludes the additional information.

A method, apparatus, non-transitory computer readable medium, and system for text simplification of complex domain-specific text are described. One or more aspects of the method, apparatus, non-transitory computer readable medium, and system include generating a simplified text based on a complex text; computing an entailment score for each sentence of the simplified text using a neural network, wherein the entailment score indicates whether the sentence of the simplified text includes information from a sentence of the complex text; filtering sentences of the simplified text based on the entailment score to obtain a modified text; computing a first hallucination score based on the complex text and the simplified text; computing a second hallucination score based on the complex text and the modified text; comparing the first hallucination score to the second hallucination score; and selecting the modified text based on the comparison.

An apparatus, system, and method for text simplification of complex domain-specific text are described. One or more aspects of the apparatus, system, and method include a processor; a memory storing instructions executable by the processor; a neural network configured to compute an entailment score for each sentence of a simplified text, wherein the entailment score indicates whether the sentence of the simplified text includes information from a sentence of a complex text corresponding to the sentence of the simplified text; and a pruning component configured to generate a modified text based on the entailment score, the simplified text, and the complex text.

DETAILED DESCRIPTION

Figure 1:
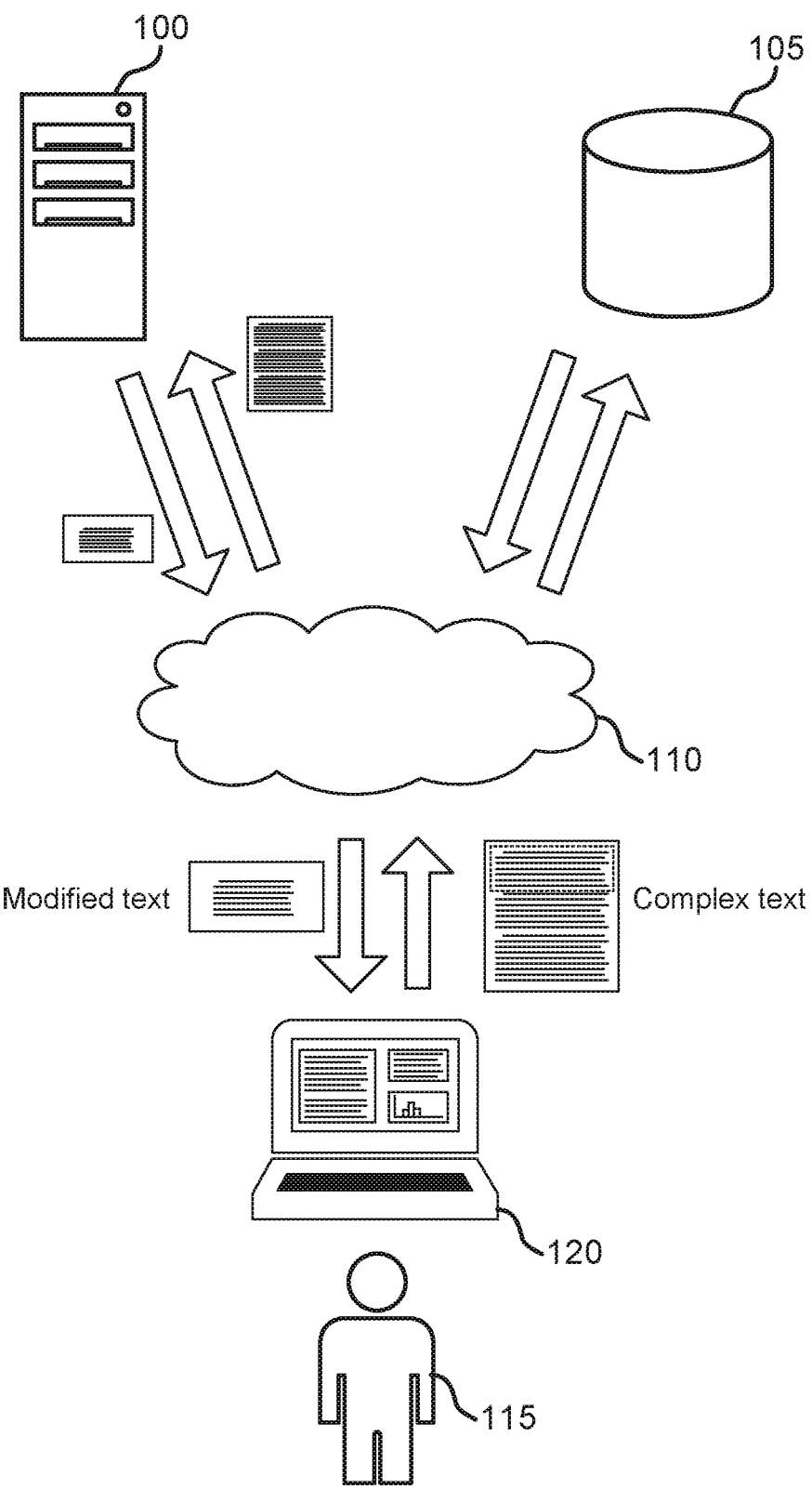
FIG. 1 shows an example of a text simplification system according to aspects of the present disclosure.

The present disclosure describes systems and methods for simplifying text, removing hallucinations from the simplified text to produce a modified text, and presenting the modified text to a user. This allows a user to consume content from a complex text with reduced difficulty, while preventing the user from receiving incorrect, inconsistent, or redundant information.

Text simplification is the task of translating a complex piece of text into a simpler version that may be more easily read and understood by a reader. This can be helpful in enabling users in reading and consuming complex documents, such as legal contracts or medical documents. Text simplification methods are useful in many areas. For example, text simplification can be applied to legal contracts to assist users in understanding agreements they are party to. Text simplification can also be applied to any complex text, especially in areas that include a large amount of jargon, such as medical papers, legal papers, scientific papers, and the like.

Text simplification is useful in many domains. For example, text simplification can be applied to contract documents. Contracts are legal documents that are used in business workflows, and include employment agreements, licensing agreements, loan agreements, and so on. Prior to signing a contract, the parties involved read through the clauses contained in the contract to understand them and ensure the signees are aware of what they are agreeing to. Legal clauses can be lengthy and highly domain-specific. This can make the clauses difficult to read and understand for people without a legal background, which is often the case for small entities such as individuals or small businesses. Embodiments provided herein will be described in this legal context for better understanding, but the present disclosure is not limited thereto, and the embodiments may be applied to other domains as suggested above.

Many text simplification models are trained using datasets that are not suited to a target domain. For example, a text simplification model trained using a general language corpus may produce several hallucinations. The hallucinations may be related to the model's attempt to provide alternative meanings for a phrase to allow the user to better understand the phrase. However, the alternative meanings can be misleading or incorrect, especially when the trained model is applied to a domain that is different than its training dataset. There is currently a lack of availability in labelled domain-specific datasets, which results in text simplification models being prone to excessive hallucinations.

Some comparative systems attempt to address hallucinations by generating domain-specific training data. In some cases, the comparative systems generate synthetic data based on original data, where the synthetic data is altered to include labeled hallucinations. Then, the systems train simplification models to avoid these hallucinations. However, this uses significant time creating and training on the synthetic data, and the resulting models can still leave several residual hallucinations.

Some other comparative systems are designed specifically for the legal domain. For example, some process text from contract agreements in order to identify contractual elements. They are able to identify the main elements in a contract, and potentially compare them with other similar contracts to identify differences. When coupled with NLP techniques, these systems can generate concise summaries of contract documents. However, these summaries are intended only to outline the high level terms, and exclude many details. Further, they are designed for only legal contracts, and are not equipped to simplify text from other domains that include jargon such as medical, scientific, and others.

Accordingly, hallucinations and redundancies are expected in the output of the text simplification models. They may be reduced by identifying and removing inconsistent or redundant content from the output. For example, if there exists any detail or element in the simplified output text that does not entail any part of an input clause from the complex text, then it is factually inconsistent from the input.

The present disclosure describes systems and methods for generating modified text from a complex text, where the modified text includes minimal hallucinations. Embodiments include an algorithm based on textual entailment to reduce hallucinated and redundant text from outputs of a text simplification model. In some cases, the text simplification model is pre-trained in a supervised manner using an out-of-domain or generalized training set. In some cases, the text simplification model is trained in an unsupervised manner. In either case, embodiments described herein are configured to operate without domain-specific training data.

Embodiments of the present disclosure include a text simplification apparatus configured to identify a simplified text that includes original information from a complex text as well as additional information that is not in the complex text. A neural network of the text simplification apparatus computes an entailment score for each sentence of the complex text, where the entailment score indicates whether the sentence of the simplified text includes information from a sentence of the complex text corresponding to the sentence of the simplified text. Then the text simplification apparatus generates a modified text based on the entailment score, the simplified text, and the complex text, where the modified text includes the original information and excludes the additional information.

Details regarding the architecture of an example text simplification system, apparatus, and user interface are provided with reference to FIGS. 1-5. Examples for text simplification, including methods and algorithms used to remove hallucinations, are provided with reference to FIGS. 6-8. Examples for training the neural network used to compute entailment, as well as training text simplification models, are provided with reference to FIGS. 9-11.

Text Simplification System

An apparatus for text simplification of complex domain-specific text is described. One or more aspects of the apparatus include a processor; a memory storing instructions executable by the processor; a neural network configured to compute an entailment score for each sentence of a simplified text, wherein the entailment score indicates whether the sentence of the simplified text includes information from a sentence of a complex text corresponding to the sentence of the simplified text; and a pruning component configured to generate a modified text based on the entailment score, the simplified text, and the complex text.

Some examples of the apparatus, system, and method further include a text simplification component configured to generate the simplified text based on the complex text, wherein the text simplification component implements one or more text simplification models. Some examples further include a hallucination scoring component configured to compute a hallucination score between the complex text and the simplified text. Some examples further include a semantic similarity component configured to compute a similarity score between the complex text and the simplified text.

Some examples of the apparatus, system, and method further include a user interface configured to receive the complex text and present the modified text and metrics based on the complex text and the modified text. In some cases, the metrics include faithfulness to the original complex text, readability of the modified text, and simplicity of the modified text.

FIG. 1 shows an example of a text simplification system according to aspects of the present disclosure. The example shown includes text simplification apparatus 100, database 105, network 110, user 115, and user interface 120.

Text simplification apparatus 100 includes components configured to implement the methods and techniques described herein. In an example, text simplification apparatus receives a complex text and a selection of the complex text to be simplified. Then, text simplification apparatus generates a simplified text and removes hallucinations to generate a modified text. Text simplification apparatus 100 is an example of, or includes aspects of, the corresponding element described with reference to FIG. 2.

In some embodiments, one or more components of text simplification apparatus 100 are implemented on a server. In some cases, all components of text simplification apparatus 100 are implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus.

According to some aspects, text simplification apparatus 100 receives a simplified text that includes original information from a complex text and additional information that is not in the complex text. In some examples, text simplification apparatus 100 divides the complex text into a first set of sentences. In some examples, text simplification apparatus 100 divides the simplified text into a second set of sentences, where an entailment score is computed based on the first set of sentences and the second set of sentences.

Embodiments of the text simplification system utilize database 105 to store original complex texts and processed modified texts. A database is an organized collection of data. For example, a database stores data in a specified format known as a schema. A database may be structured as a single database, a distributed database, multiple distributed databases, or an emergency backup database. In some cases, a database controller may manage data storage and processing in database 105. In some cases, user 115 interacts with the database controller. In other cases, the database controller may operate automatically without user interaction.

Network 110 facilitates the transfer of information between user 115, database 105, and text simplification apparatus 100. In some cases, network 110 is referred to as a "cloud." A cloud is a computer network configured to provide on-demand availability of computer system resources, such as data storage and computing power. In some examples, the cloud provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network comprising multiple edge routers and core routers. In another example, a cloud is based on a local collection of switches in a single physical location.

According to some aspects, user interface 120 is configured to receive the complex text and present the modified text and metrics based on the complex text and the modified text. An example of a user interface will be described in greater detail with reference to FIG. 5.

Figure 2:
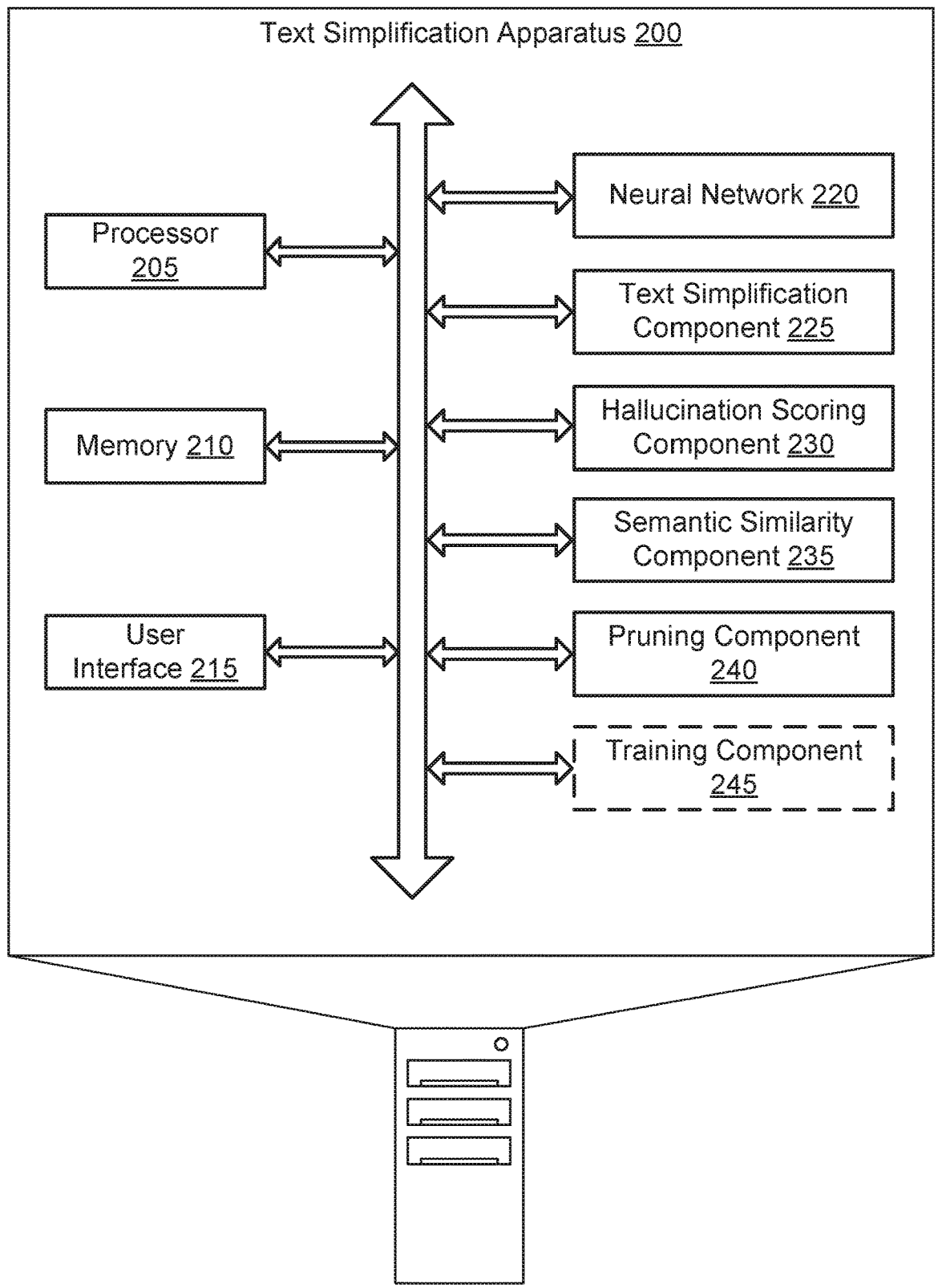
FIG. 2 shows an example of a text simplification apparatus according to aspects of the present disclosure.

FIG. 2 shows an example of a text simplification apparatus 200 according to aspects of the present disclosure. The example shows text simplification apparatus 200, which includes processor 205, memory 210, user interface 215, neural network 220, text simplification component 225, hallucination scoring component 230, semantic similarity component 235, pruning component 240, and training component 245.

Processor 205 executes instructions which implement components of text simplification apparatus 200. A processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array using a memory controller. The memory array may be within a memory located on text simplification apparatus 200, such as memory 210. In some embodiments, the memory array is included on an external memory. In some embodiments, the memory controller is integrated into processor 205. Processor 205 is configured to execute computer-readable instructions stored in memory 210 to perform various functions. In some embodiments, a processor 205 includes special purpose components for modem processing, baseband processing, digital signal processing, or transmission processing.

Memory 210 stores instructions for processor 205, and may further be used to store the texts used in the simplification process. Memory 210 may work with a database as described with reference to FIG. 1 to provide storage for text simplification apparatus 200. Memory 210 includes one or more memory devices. Examples of a memory device include random access memory (RAM), read-only memory (ROM), or a hard disk. Further examples include solid state memory and a hard disk drive. In some examples, memory is used to store computer-readable, computer-executable software including instructions that, when executed, cause processor 205 to perform various functions described herein. In some cases, memory 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

User interface 215 allows a user to input a selection or reference to a complex text, as well as optional configurable parameters. User interface 215 then displays a modified text, which is a simplification of the complex text with hallucinations removed. A user interface may enable a user to interact with a device. In some embodiments, the user interface may include an audio device, such as an external speaker system, an external display device such as a display screen, or an input device (e.g., remote control device interfaced with the user interface 120 directly or through an IO controller module). In some cases, a user interface may be a graphical user interface (GUI). User interface 120 is an example of, or includes aspects of, the corresponding element described with reference to FIGS. 2, 4, and 5. User interface 215 is an example of, or includes aspects of, the corresponding element described with reference to FIGS. 1, 4, and 5.

As used herein, neural network 220 refers to the model used to compute entailment scores between a complex text and a simplified text. However, other components, such as text simplification component 225, hallucination scoring component 230, or semantic similarity component 235, may also include an artificial neural network (ANN).

Neural network 220 computes entailment scores between a complex text and a simplified text. Neural network 220 is trained on data which may include complex sentences, as well as simplified sentences that are labeled as entailing the complex sentences or not entailing the complex sentences. Accordingly, neural network 220 is trained to determine whether a simplified sentence from a simplified text entails a complex sentence. In some embodiments, neural network 220 includes several hidden layers such that the determination is made by processing latent, unlabeled information. In some embodiments, some layers correspond to tagged elements (for example, slot categories) from the complex text, and neural network 220 then compares the elements between the complex text and the generated simplified text to determine the entailment score.

A neural network is a type of computer algorithm that is capable of learning specific patterns without being explicitly programmed, but through iterations over known data. A neural network may refer to a cognitive model that includes input nodes, hidden nodes, and output nodes. Nodes in the network may have an activation function that computes whether the node is activated based on the output of previous nodes. Training the system may involve supplying values for the inputs, and modifying edge weights and activation functions (algorithmically or randomly) until the result closely approximates a set of desired outputs.

According to an embodiment, neural network 220 includes a bi-directional encoder representations from transformers (BERT) architecture. BERT is a transformer-based model that is used for natural language processing and for processing other forms of ordered data. In some examples, BERT is used as a language representation model, and is configured to pretrain deep bidirectional representations from unlabeled text by jointly conditioning on both left and right context in all layers. As a result, the pre-trained BERT model can be fine-tuned with an additional output layer to create network models for tasks such as question answering and language inference. Neural network 220 is an example of, or includes aspects of, the corresponding element described with reference to FIGS. 1 and 4.

Text simplification component 225 is used to generate simplified text. For example, text simplification component 225 may implement one or more text simplification models. Each model may have a different approach and architecture for generating supervised text. Some text simplification models include an ANN which is trained in a supervised manner. Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples. An embodiment of a text simplification model trained in a supervised manner will be described in greater detail with reference to FIG. 10.

In some embodiments, one of the text simplification models used in text simplification component 225 includes an ANN which is trained in an unsupervised manner. Unsupervised learning is one of the three basic machine learning paradigms, alongside supervised learning and reinforcement learning. Unsupervised learning draws inferences from datasets consisting of input data without labeled responses. Unsupervised learning may be used to find hidden patterns or grouping in data. For example, cluster analysis is a form of unsupervised learning. Clusters may be identified using measures of similarity such as Euclidean or probabilistic distance. Self-supervised learning may be considered unsupervised learning, as self-supervised processes similarly do not involve supervised data. For example, a text simplification model that was trained in a self-supervised manner may generate a simplified text, then calculate a score for the generated text. Then, the model may train itself based on the score. An embodiment of a text simplification model of text simplification component 225 that is trained in a supervised manner will be described in greater detail with reference to FIG. 11.

Text simplification component 225 may include a transformer network. A transformer or transformer network is a type of neural network model used for natural language processing tasks. A transformer network transforms one sequence into another sequence using an encoder and a decoder. An encoder and decoder include modules that can be stacked on top of each other multiple times. The modules comprise multi-head attention and feed forward layers. The inputs and outputs (target sentences) are first embedded into an n-dimensional space. Positional encoding of the different words (i.e., give every word/part in a sequence a relative position since the sequence depends on the order of its elements) are added to the embedded representation (n-dimensional vector) of each word. In some examples, a transformer network includes attention mechanism, where the attention looks at an input sequence and decides at each step which other parts of the sequence are important. Some examples of the transformer model are based on iterations of the transformer model such as GPT-2. In some cases, the transformer model is configured as an encoder-decoder model that receives data in sequence form and output data in sequence form, i.e. "seq2seq."

According to some aspects, text simplification component 225 generates the simplified text based on a complex text using a text simplification model. In some examples, text simplification component 225 generates an alternative simplified text based on the complex text using an alternative text simplification model. In some examples, text simplification component 225 generates an alternative modified text based on the alternative simplified text. Text simplification component 225 is an example of, or includes aspects of, the corresponding element described with reference to FIGS. 4 and 11.

Some embodiments of text simplification apparatus 200 include hallucination scoring component 230. In some examples, hallucination scoring component 230 compares full paragraphs or groups of sentences from the complex text in the simplified text. According to some aspects, hallucination scoring component 230 computes a first hallucination score based on the complex text and the simplified text. In some examples, hallucination scoring component 230 computes a second hallucination score based on the complex text and the modified text. Pruning component 240 may then generate a modified text based at least in part on the first and second hallucination scores.

In some examples, hallucination scoring component 230 identifies a first set of entities in the complex text. In some examples, hallucination scoring component 230 identifies a second set of entities in the simplified text. In some examples, hallucination scoring component 230 compares the first set of entities to the second set of entities. In some examples, hallucination scoring component 230 computes the first hallucination score based on the comparison. Hallucination scoring component 230 is an example of, or includes aspects of, the corresponding element described with reference to FIG. 4.

According to some aspects, semantic similarity component 235 computes a first similarity score based on the complex text and the simplified text. In some examples, semantic similarity component 235 computes a second similarity score based on the complex text and the modified text.

Some embodiments of text simplification apparatus 200 include semantic similarity component 235. Semantic similarity component 235 is configured to compute a similarity score between the complex text and the simplified text. In some embodiment, the similarity score is based on a cosine similarity between embeddings of the two texts in a transformer network. Similar to embodiments of hallucination scoring component 230, some embodiments of semantic similarity component 235 may compare the complex text with the simplified or modified texts at the paragraph level, rather than the sentence level. In some cases, if the generated modified text does not pass a semantic similarity threshold, the original simplified text may be chosen as the modified text, rather than the modified text generated by pruning component 240. Semantic similarity component 235 is an example of, or includes aspects of, the corresponding element described with reference to FIG. 4.

According to some aspects, pruning component 240 filters sentences of the simplified text based on the entailment score to obtain a modified text. Pruning component 240 uses entailment scores from neural network 220, hallucination scores from hallucination scoring component 230, and semantic similarity scores from semantic similarity component 235 to generate a modified text with minimal hallucinations. According to some aspects, pruning component 240 generates the modified text such that it includes original information from the complex text and excludes additional information.

In some examples, pruning component 240 determines whether any of the set of entailment scores exceeds an entailment score threshold. In some examples, pruning component 240 determines whether to include the sentence of the simplified text in the modified text based on the score determination. In some examples, pruning component 240 compares the first hallucination score to the second hallucination score. In some examples, pruning component 240 selects the modified text based on the comparison. In some examples, pruning component 240 compares the first similarity score to the second similarity score. In some examples, pruning component 240 selects the modified text based on the comparison. Pruning component 240 is an example of, or includes aspects of, the corresponding element described with reference to FIG. 4.

Training component 245 is used to train one or more components of text simplification apparatus 200. For example, training component 245 is used to train components that are configured to learn and adjust parameters thereof, in applicable embodiments. Such components include neural network 220 and text simplification component 225, though embodiments are not limited thereto.

According to some aspects, training component 245 receives a text simplification training dataset, where the text simplification training dataset includes a set of sentence pairs. In some examples, training component 245 updates parameters of the text simplification model based on the text simplification training dataset. In some examples, training component 245 receives an entailment training dataset including a first set of training sentences, a second set of training sentences, and ground-truth entailment data, where the ground-truth entailment data includes entailment relationships between the first set of training sentences and the second set of training sentences. In some examples, training component 245 updates parameters of the neural network 220 based on the training dataset.

Training component 245 is an example of, or includes aspects of, the corresponding element described with reference to FIG. 11. In at least one embodiment, training component 245 is implemented on an apparatus different from text simplification apparatus 200, and may communicate with text simplification apparatus 200 through, for example, a network as described with reference to FIG. 1.

Figure 3:
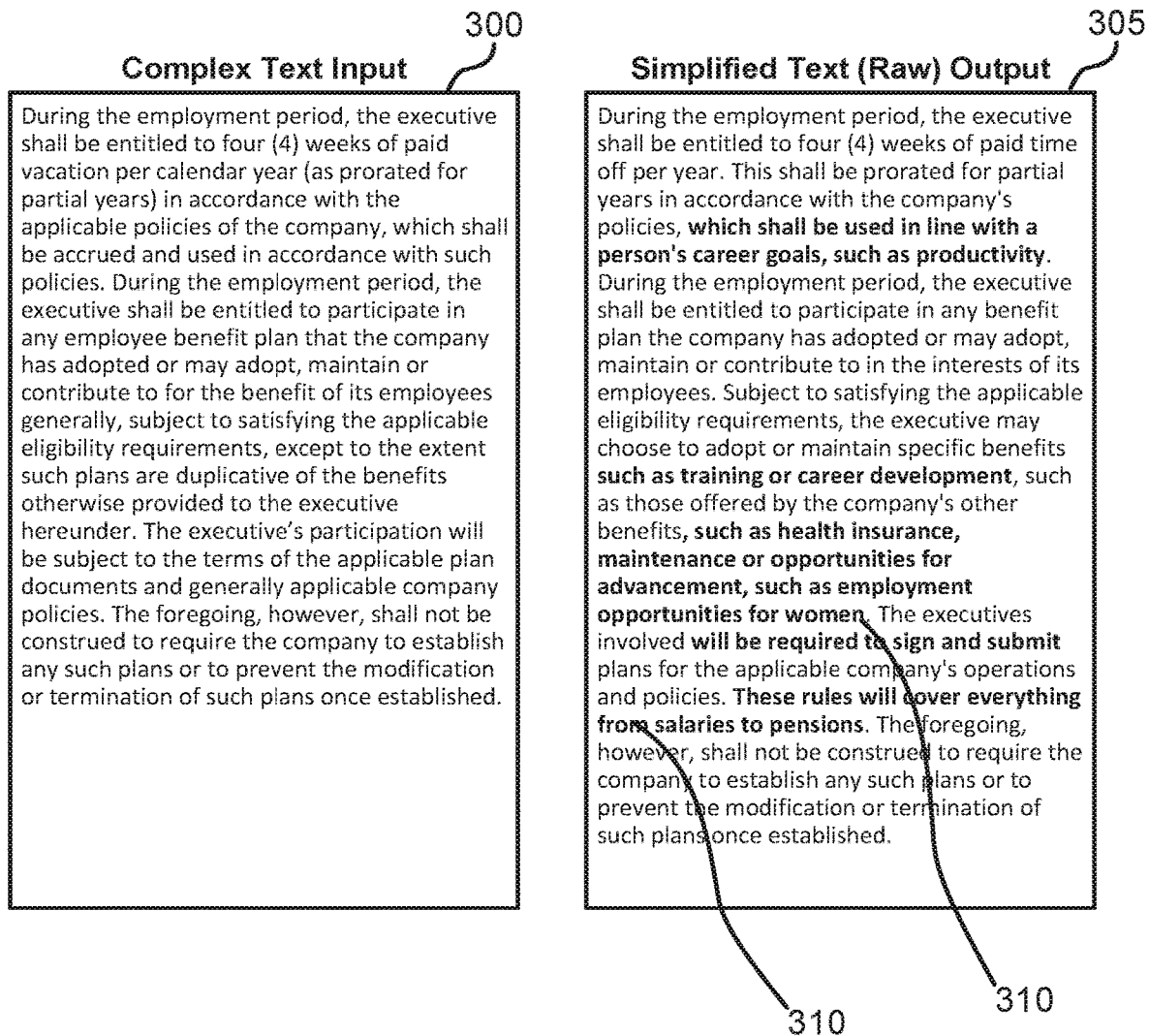
FIG. 3 shows examples of a complex text, a simplified text, and hallucinations within the simplified text according to aspects of the present disclosure.

FIG. 3 shows examples of a complex text, a simplified text, and hallucinations within the simplified text according to aspects of the present disclosure. The example shown includes complex text 300, simplified text 305, and hallucinations 310.

In one example, complex text 300 is a selected portion from a legal document, such as a contract. Complex text 300 may include "jargon," which generally refers to uncommon words used in a particular domain that can be difficult for readers outside the domain to understand. Complex text 300 is an example of, or includes aspects of, the corresponding element described with reference to FIGS. 4, 5, and 11.

Simplified text 305 may be a text that is output from a text simplification component based on a text simplification model. For example, simplified text 305 may be generated text which is based on complex text 300. As discussed earlier, in the absence of custom domain-specific datasets, the text simplification model may be either trained on a generalized dataset, or trained in an unsupervised manner. Accordingly, simplified text 305 may include several hallucinations 310, which are the result of using the text simplification model. Simplified text 305 is an example of, or includes aspects of, the corresponding element described with reference to FIGS. 4 and 11.

Hallucinations 310 are portions of text that are incorrect, inconsistent, or redundant with respect to an input complex text 300. In the legal context, such additional information can misrepresent the original document, and mislead a reader/signee. Embodiments of the present disclosure are designed to remove hallucinations 310 based on, for example, entailment scoring.

Figure 4:
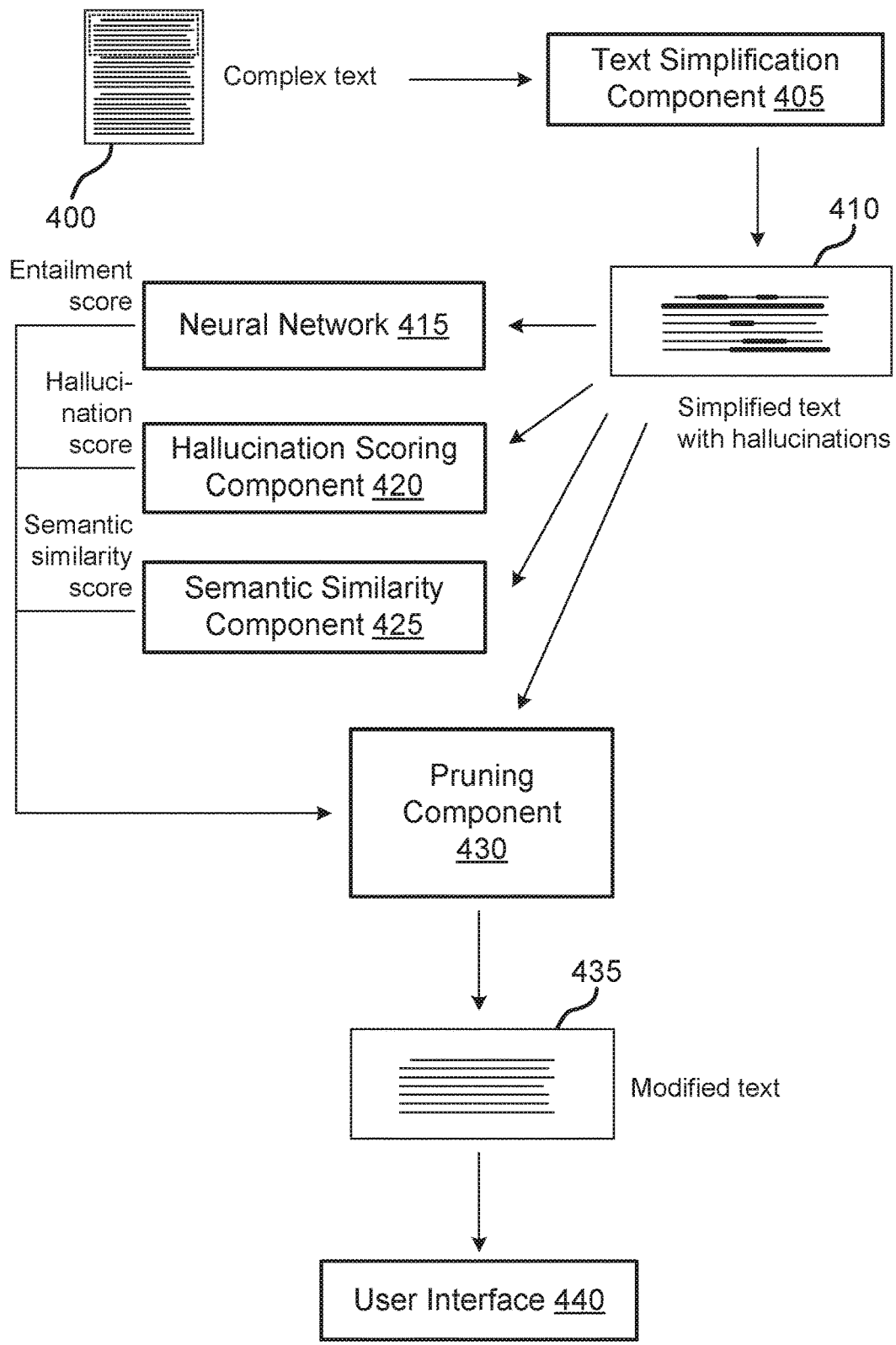
FIG. 4 shows an example of a pipeline for language processing according to aspects of the present disclosure.

FIG. 4 shows an example of a pipeline for language processing according to aspects of the present disclosure. Specifically, FIG. 4 illustrates an example process for generating simplified text from a complex text, and then removing hallucinations from the simplified text to generate a modified text, and presenting the modified text to a user. The example shown includes complex text 400, text simplification component 405, simplified text 410, neural network 415, hallucination scoring component 420, semantic similarity component 425, pruning component 430, modified text 435, and user interface 440.

In the example shown, complex text 400 is input to text simplification component 405 a text simplification apparatus for simplification. In some cases, complex text 400 is referenced or otherwise identified by a user through a user interface. For example, a user may select identify a document containing complex text, and then select a portion from the document to be simplified. Complex text 400 is an example of, or includes aspects of, the corresponding element described with reference to FIGS. 3, 5, and 11.

Text simplification component 405 includes one or more text simplification models. In some embodiments, text simplification component 405 includes a generative text simplification model that is trained in a supervised manner on a general language corpus including complex-simple sentence pairs. Some embodiments of text simplification component 405 include a generative text simplification model that is trained in an unsupervised manner. In this case, the training may include a language corpus, but without labeled complex-simple sentence pairs. Text simplification component 405 generates simplified text 410, which may include hallucinations. Text simplification component 405 is an example of, or includes aspects of, the corresponding element described with reference to FIGS. 2 and 11.

In this example, simplified text 410 from text simplification component 405 contains several hallucinations. Simplified text 410 is an example of, or includes aspects of, the corresponding element described with reference to FIGS. 3 and 11. Simplified text 410 is input to neural network 415, hallucination scoring component 420, and semantic similarity component 425. Hallucinations are removed by pruning component 430 based on entailment scores. For example, neural network 415 may, for each sentence of simplified text 410, determine entailment scores corresponding to how well each sentence of complex text 400 entails the sentence of simplified text 410.

Pruning component 430 uses the entailment scores, hallucination scores, and semantic similarity scores to generate modified text 435. In some embodiments, pruning component 430 constructs a new body of text based on the entailment scores, adding sentences from simplified text 410 according to whether each sentence passes an entailment score threshold. Then, pruning component 430 may compare a first hallucination score (e.g., a degree of hallucination) of simplified text 410 with a second hallucination score of the new body of text. If the new body of text has a lower degree of hallucination, or is below a hallucination score threshold, pruning component 430 may select the new body of text as modified text 435 to present to the user via user interface 440. Otherwise, pruning component 430 may select simplified text 410 as modified text 435.

Pruning component 430 may further compare a first semantic similarity score of simplified text 410 with a second semantic similarity score of the new body of text. The first semantic similarity score may measure a cosine similarity between simplified text 410 and complex text 400. The second semantic similarity score may measure a cosine similarity between the new body of text and complex text 400. In an embodiment, if difference between semantic similarity scores is within a threshold, indicating the new body of text is close to simplified text 410 in terms of similarity with respect to complex text 400, then pruning component 430 may select the new body of text as modified text 435. If difference between similarity scores surpasses the threshold, however, then pruning component 430 may select simplified text 410 as modified text 435.

Once the modified text 435 has been determined, it is presented to a user via user interface 440. Embodiments of user interface 440 include a graphical user interface, and may be a web application or portal configured to render information on a user device. In some cases, user interface 440 further presents metrics for modified text 435.

Neural network 415 is an example of, or includes aspects of, the corresponding element described with reference to FIGS. 1 and 2. Hallucination scoring component 420 is an example of, or includes aspects of, the corresponding element described with reference to FIG. 2. Semantic similarity component 425 is an example of, or includes aspects of, the corresponding element described with reference to FIG. 2.

Pruning component 430 is an example of, or includes aspects of, the corresponding element described with reference to FIG. 2. User interface 440 is an example of, or includes aspects of, the corresponding element described with reference to FIGS. 1, 2, and 5.

Figure 5:
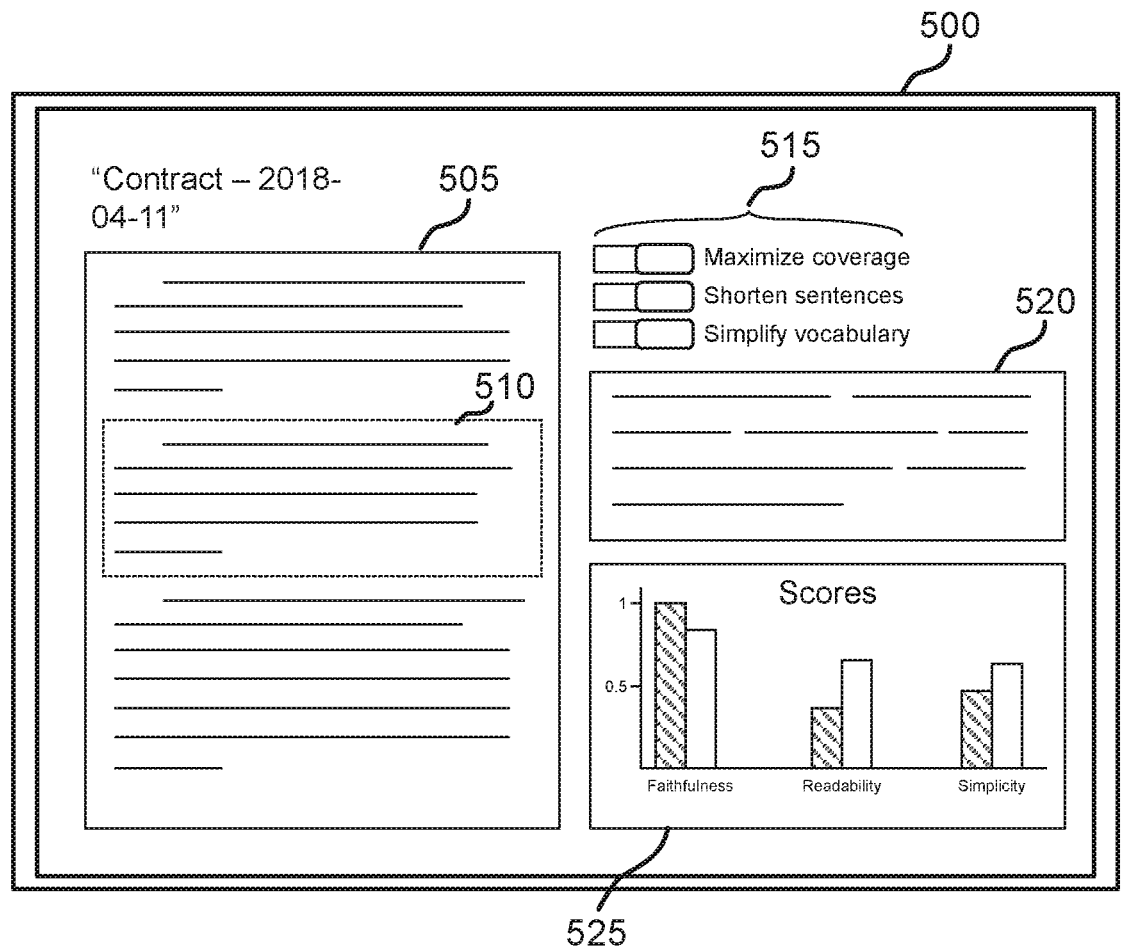
FIG. 5 shows an example of a user interface according to aspects of the present disclosure.

FIG. 5 shows an example of a user interface 500 according to aspects of the present disclosure. The example shown includes user interface 500, input document 505, complex text 510, configurable options 515, modified text 520, and metrics 525.

In an example configuration, user interface 500 allows a user to upload or select input document 505, and may then render all or portions of input document 505 in a screen view. The user can then select or highlight a portion of the document as complex text 510. In some embodiments, user interface 500 further presents configurable options 515. Different settings of configurable options 515 can affect the text simplification process. For example, a "maximize coverage" setting may ensure that every element from the complex text is entailed. A "shorten sentences" setting may affect a text simplification model's generation, such that the text simplification model emphasizes producing short sentences. A "simplify vocabulary" setting may adjust a threshold for what constitutes a "common" word, e.g., the text simplification model may generate a word, determine a number of times the word appears in a corpus of common text, and then adjust the threshold for how many number of times the word must appear in order to be included in modified text 520.

After complex text 510 is selected and configurable options 515 are set, a text simplification apparatus may generate simplified text and prune hallucinations from it to generate modified text 520. In some embodiments of user interface 500, metrics of modified text 520 are also presented as metrics 525. These metrics may include faithfulness to the original complex text, readability of the modified text, and simplicity of the modified text. For example, faithfulness may be measured by a combination of a semantic similarity score and a hallucination score (e.g., a degree of hallucination). Readability may be measured by one or more of the following: Automatic Readability Index (ARI), a Simple Measure of Gobbledygook (SMOG), and Flesch Kincaid. Simplicity may be measured in several ways, including dependency depth. Dependency depth is the depth (s) of dependency parse trees of sentences. A lower depth indicates sentences with less nesting of clauses and ideas and fewer long-range dependencies.

User interface 500 is an example of, or includes aspects of, the corresponding element described with reference to FIGS. 1, 2, and 4. Complex text 510 is an example of, or

Text Simplification and Hallucination Pruning includes aspects of, the corresponding element described with reference to FIGS. 3, 4, and 11. Modified text 520 is an example of, or includes aspects of, the corresponding element described with reference to FIG. 4.

A method for text simplification of complex domain-specific text is described. One or more aspects of the method include identifying a simplified text that includes original information from a complex text and additional information that is not in the complex text; computing an entailment score for each sentence of the simplified text using a neural network, wherein the entailment score indicates whether the sentence of the simplified text includes information from a sentence of the complex text corresponding to the sentence of the simplified text; and generating a modified text based on the entailment score, the simplified text, and the complex text, wherein the modified text includes the original information and excludes the additional information.

Some examples of the method, apparatus, non-transitory computer readable medium, and system further include generating the simplified text based on the complex text using a text simplification model. Some examples of the method, apparatus, non-transitory computer readable medium, and system further include generating an alternative simplified text based on the complex text using an alternative text simplification model. Some examples further include generating an alternative modified text based on the alternative simplified text.

For example, the text simplification model may be a model that is trained in a supervised manner on a generalized dataset including labeled complex-simple sentence pairs. The alternative text simplification model may be a model that is trained in an unsupervised manner based on a large language corpus, where the language corpus does not include complex-simple pairs. Embodiments of the present application include a text simplification component which can implement either or both of these models.

Some examples of the method, apparatus, non-transitory computer readable medium, and system further include computing a plurality of entailment scores for the sentence of the simplified text, wherein the plurality of entailment scores correspond to a plurality of sentences from the complex text, respectively. Some examples further include determining whether any of the plurality of entailment scores exceeds an entailment score threshold. Some examples further include determining whether to include the sentence of the simplified text in the modified text based on the score determination.

Some examples of the method, apparatus, non-transitory computer readable medium, and system further include computing a first hallucination score based on the complex text and the simplified text. Some examples further include computing a second hallucination score based on the complex text and the modified text. Some examples further include comparing the first hallucination score to the second hallucination score. Some examples further include selecting the modified text based on the comparison.

Some examples of the method, apparatus, non-transitory computer readable medium, and system further include identifying a first set of entities in the complex text. Some examples further include identifying a second set of entities in the simplified text. Some examples further include comparing the first set of entities to the second set of entities. Some examples further include computing the first hallucination score based on the comparison.

Some examples of the method, apparatus, non-transitory computer readable medium, and system further include computing a first similarity score based on the complex text and the simplified text. Some examples further include computing a second similarity score based on the complex text and the modified text. Some examples further include comparing the first similarity score to the second similarity score. Some examples further include selecting the modified text based on the comparison.

Some examples of the method, apparatus, non-transitory computer readable medium, and system further include dividing the complex text into a first set of sentences. Some examples further include dividing the simplified text into a second set of sentences, wherein the entailment score is computed based on the first set of sentences and the second set of sentences.

Figure 6:
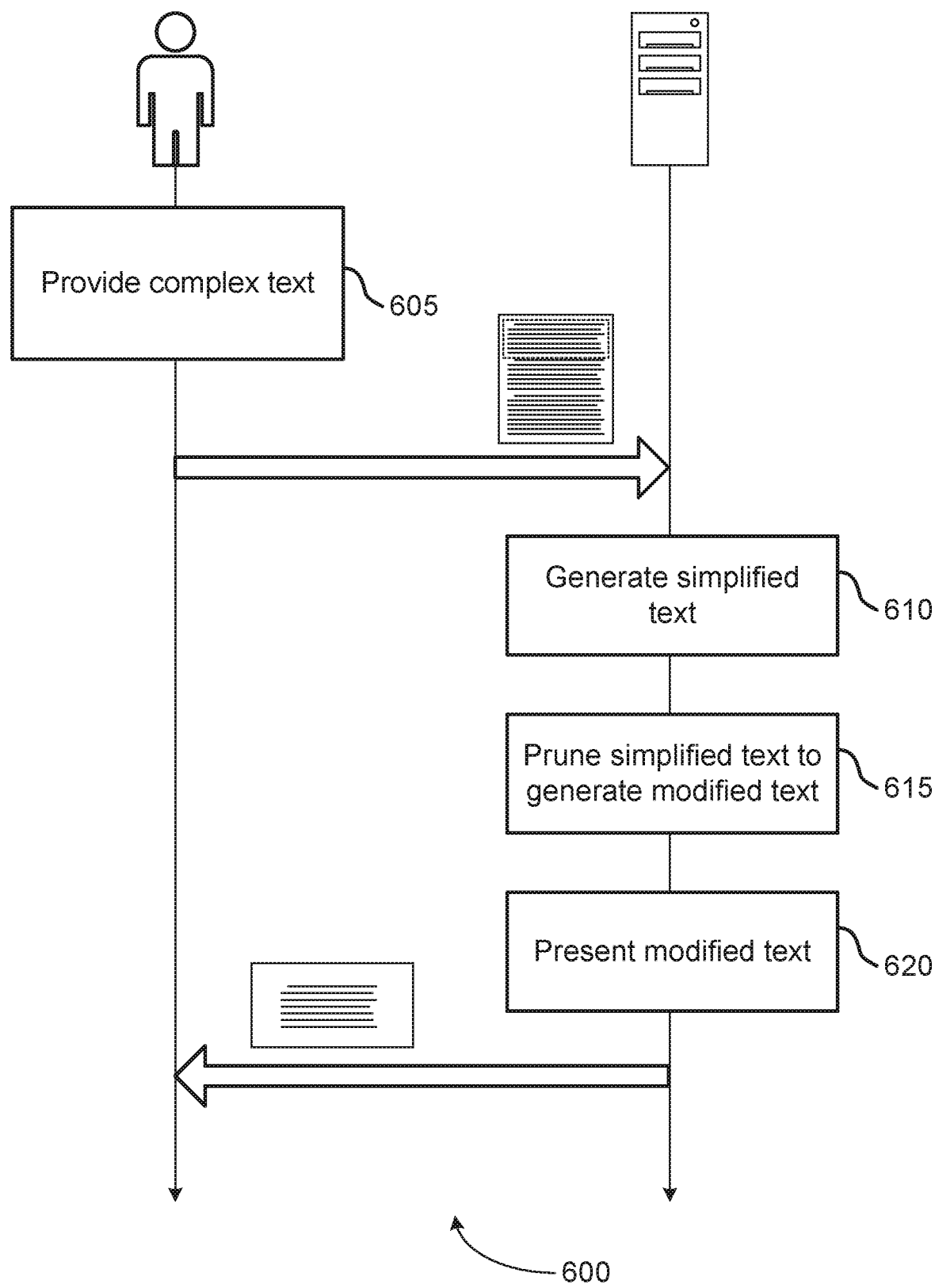
FIG. 6 shows an example of a method for providing simplified text with minimal hallucinations according to aspects of the present disclosure.

FIG. 6 shows an example of a method 600 for providing simplified text with minimal hallucinations according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, a user provides complex text. In some cases, the complex text is referenced or otherwise identified by a user through a user interface. For example, a user may select identify a document containing complex text, and then select a portion from the document to be simplified.

At operation 610, the system generates simplified text. The simplified text may be generated by a text simplification component, which may include a transformer ANN such as GPT-2. The text simplification component may implement one or more text simplification models. Because the text simplification models are trained on either a generalized text simplification dataset (e.g., in a supervised manner), or a general language corpus (e.g., in an unsupervised manner), the text simplification models may produce hallucinations within the simplified text.

Accordingly, at operation 615, the system prunes simplified text to generate modified text. In an example process, the system uses entailment scores to generate a new body of text, and then determines whether the new body of text is acceptable based on a hallucination score and a semantic similarity. If the new body of text passes those thresholds, then the new body of text is used as the modified text.

At operation 620, the system presents modified text. The system may present the modified text to a user through, for example, a user interface such as a web application or similar.

Figure 7:
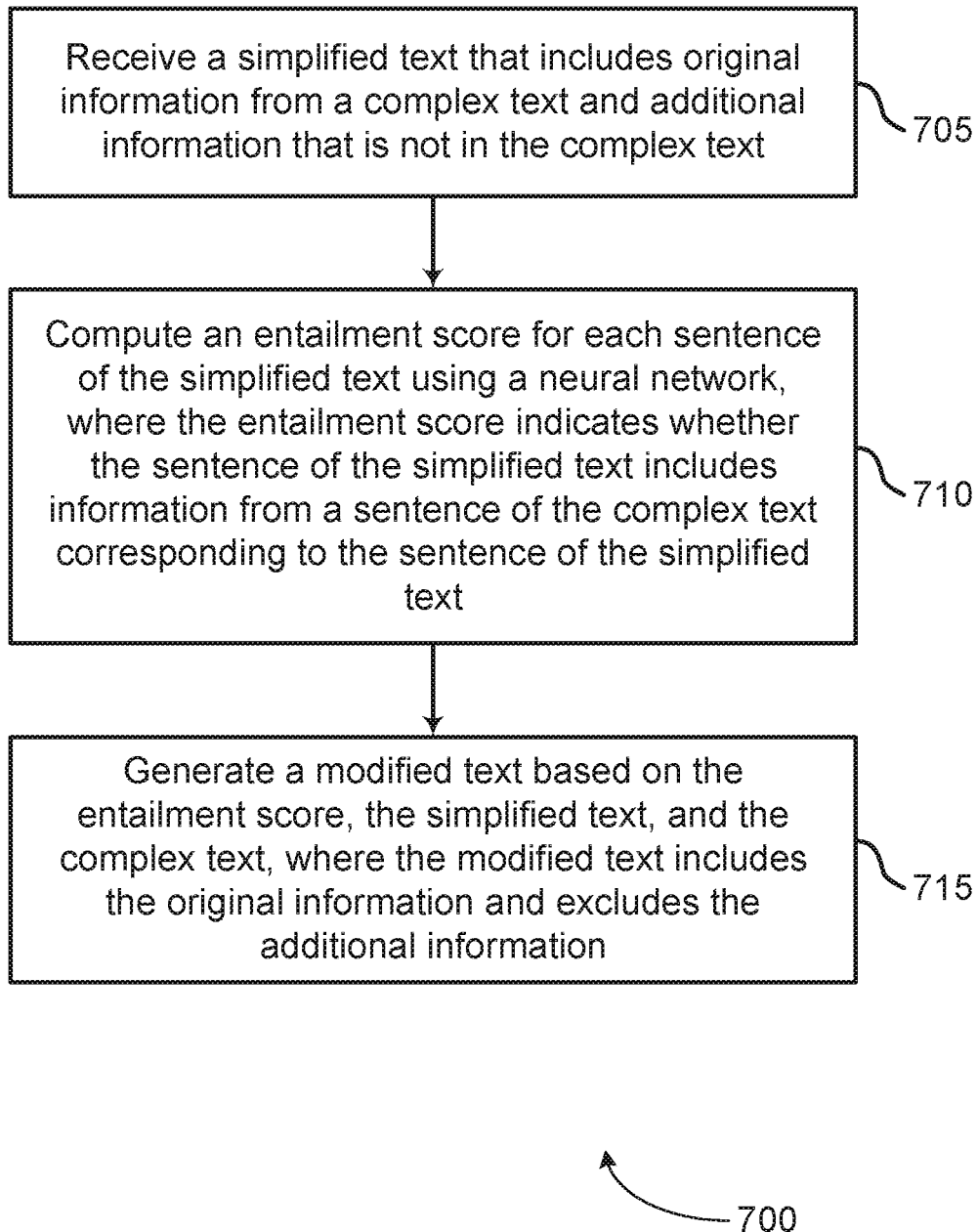
FIG. 7 shows an example of a method for language processing according to aspects of the present disclosure.

FIG. 7 shows an example of a method 700 for language processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system receives a simplified text that includes original information from a complex text and additional information that is not in the complex text. In some examples, a user identifies the complex text, and a component within the system generates the simplified text with the additional information. The additional information may correspond to the hallucinations as described herein. In some cases, the operations of this step refer to, or may be performed by, a text simplification apparatus as described with reference to FIGS. 1 and 2.

At operation 710, the system computes an entailment score for each sentence of the simplified text using a neural network, where the entailment score indicates whether the sentence of the simplified text includes information from a sentence of the complex text corresponding to the sentence of the simplified text. In some examples, the neural network computes a plurality of entailment scores for each sentence of the simplified text, where each of the plurality of entailment scores describes how well the sentence of the simplified text entails a sentence from the complex text. Additional detail regarding the neural network is provided with reference to FIG. 2. In some cases, the operations of this step refer to, or may be performed by, a neural network as described with reference to FIGS. 1, 2, and 4.

At operation 715, the system generates a modified text based on the entailment score, the simplified text, and the complex text, where the modified text includes the original information and excludes the additional information. In some examples, an intermediate new body of text is generated based on the entailment score, and the system measures the new body of text for a degree of hallucination and a semantic similarity between the complex text. Then, if the new body of text has a degree of hallucination below a threshold, and a semantic similarity above a threshold, the new body of text is selected as the modified text. In some cases, the operations of this step refer to, or may be performed by, a pruning component as described with reference to FIGS. 2 and 4.

Figure 8:
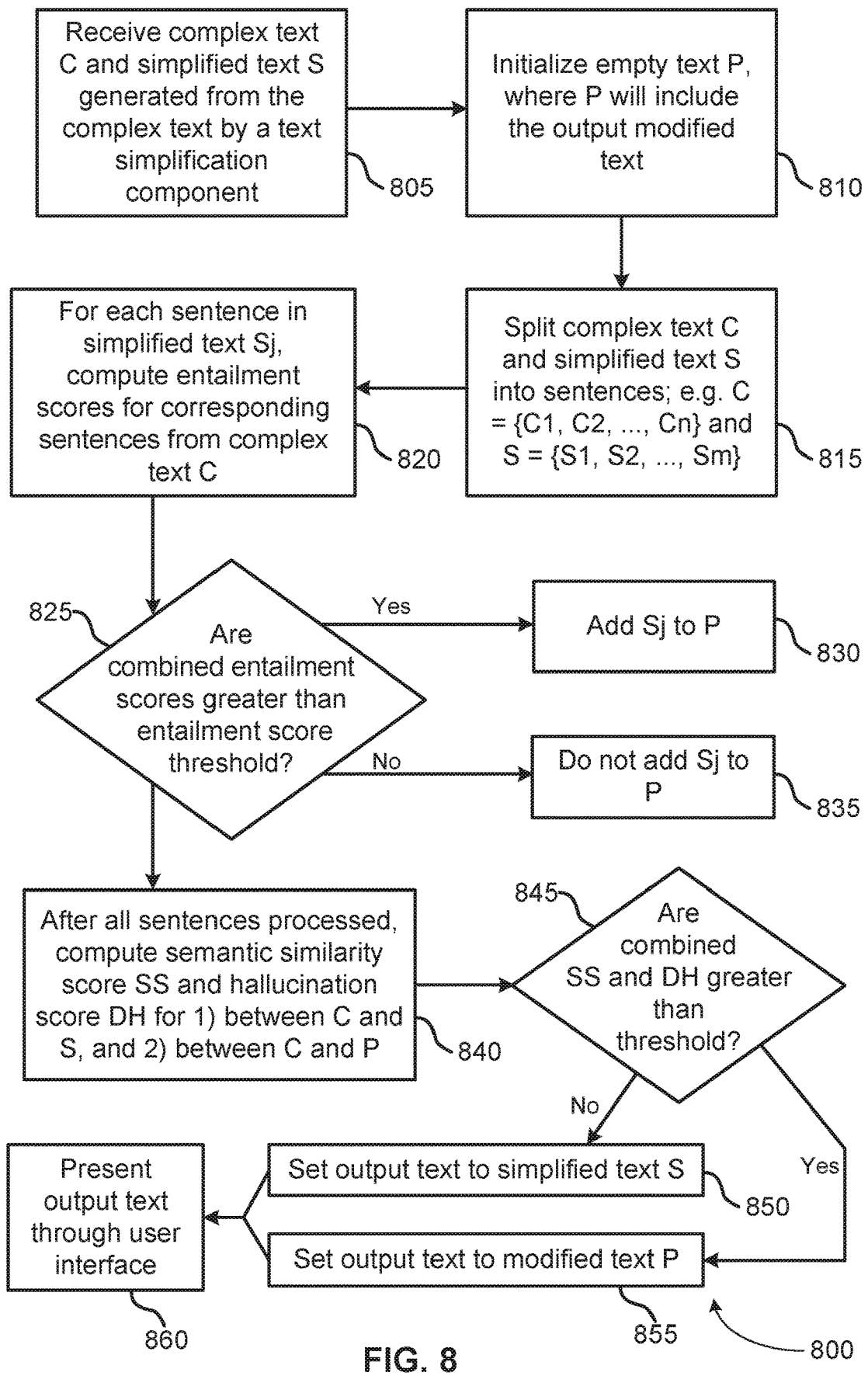
FIG. 8 shows an example of a method for pruning a simplified text according to aspects of the present disclosure.

FIG. 8 shows an example of a method 800 for pruning a simplified text according to aspects of the present disclosure. Method 800 is an example of an algorithm implemented by the pruning component as described with reference to FIGS. 2 and 4. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system receives a complex text C and a simplified text S, where S is generated from the complex text by a text simplification component. The simplified text S may be generated by a text simplification model of the text simplification component, where the text simplification model is implemented by a transformer network such as GPT-2 or similar as described above.

At operation 810, the system initializes an empty text P, where P will include the output modified text. P may be a data structure which is configured to contain representations of sentences, such as encodings.

At operation 815, the system splits the complex text C and the simplified text S into sentences; e.g. C={C1, C2, ..., Cn} and S={S1, S2, ..., Sm}. In this example, there are n sentences in the complex text C and m sentences in the simplified text S. In many cases, the simplified text S comprises a greater number of sentences than the complex text S, as increasing the number of sentences typically increases readability. For example, fewer sentences may result in increased readability based on the metrics discussed in the description for FIG. 5.

At operation 820, the system computes entailment scores for each sentence in the simplified text sentence Sj. For a given simplified text sentence Sj, a plurality of scores are computed based on sentences from the complex text C.

At operation 825, the system determines if the combined entailment scores are greater than an entailment score threshold. If so, at operation 830, the system adds Sj to P. Otherwise, at operation 835, the system does not add Sj to P.

After all sentences from the simplified text are processed, (e.g., a list of plurality scores are determined for each sentence from the simplified text) P is fully constructed. P corresponds to the "new body of text" as described above with reference to FIGS. 4, 6, and 7. At operation 840, system computes a semantic similarity score SS and a hallucination score DH for 1) between C and S, and 2) between C and P.

At operation 845, the system determines if SS and DH are greater than some threshold(s). In some cases, the system determines each score SS and DH against corresponding thresholds. For example, the hallucination score DH may represent a degree of hallucination, and in some embodiments, a lower score indicates a lower degree of hallucination. In this case, operation 845 may determine if DH is below a threshold (low hallucination) and if SS is above a threshold (high similarity) in order to "pass" P, and proceed to operation 855. If the scores between C and P are above the threshold(s) (i.e., P passes with a low degree of hallucination and a high semantic similarity), at operation 855, the system sets output text to modified text P. Otherwise, if P "fails,", at operation 850, the system sets output text to simplified text S. This completes the pruning algorithm.

At operation 860, the system presents output text through user interface. In some cases, the system additionally outputs metrics of the modified text including faithfulness, readability, and simplicity.

Training

A method for text simplification of complex domain-specific text is described. One or more aspects of the method include generating a simplified text based on a complex text; computing an entailment score for each sentence of the simplified text using a neural network, wherein the entailment score indicates whether the sentence of the simplified text includes information from a sentence of the complex text; filtering sentences of the simplified text based on the entailment score to obtain a modified text; computing a first hallucination score based on the complex text and the simplified text; computing a second hallucination score based on the complex text and the modified text; comparing the first hallucination score to the second hallucination score; and selecting the modified text based on the comparison.

Some examples of the method, apparatus, non-transitory computer readable medium, and system further include identifying a first set of entities in the complex text, a second set of entities in the simplified text, and a third set of entities in the modified text. Some examples further include comparing the first set of entities to the second set of entities to compute the first hallucination score. Some examples further include comparing the first set of entities to the third set of entities to compute the second hallucination score.

Some examples further include generating the simplified text based on the complex text using a text simplification model. Some examples further include generating an alternative simplified text based on the complex text using an alternative text simplification model. Some examples further include generating an alternative modified text based on the alternative simplified text. Some examples further include comparing the modified text and the alternative modified text.

Some examples of the method, apparatus, non-transitory computer readable medium, and system further include receiving a text simplification training dataset, wherein the text simplification training dataset includes a plurality of sentence pairs. Some examples further include updating parameters of the text simplification model based on the text simplification training dataset.

Some examples of the method, apparatus, non-transitory computer readable medium, and system further include receiving an entailment training dataset including a first set of training sentences, a second set of training sentences, and ground-truth entailment data, wherein the ground-truth entailment data includes entailment relationships between the first set of training sentences and the second set of training sentences. Some examples further include updating parameters of the neural network based on the training dataset.

Some examples of the method, apparatus, non-transitory computer readable medium, and system further include computing a plurality of entailment scores for the sentence of the simplified text, wherein the plurality of entailment scores correspond to a plurality of sentences from the complex text, respectively. Some examples further include determining whether any of the plurality of entailment scores exceeds an entailment score threshold. Some examples further include determining whether to include the sentence of the simplified text in the modified text based on the score determination.

Figure 9:
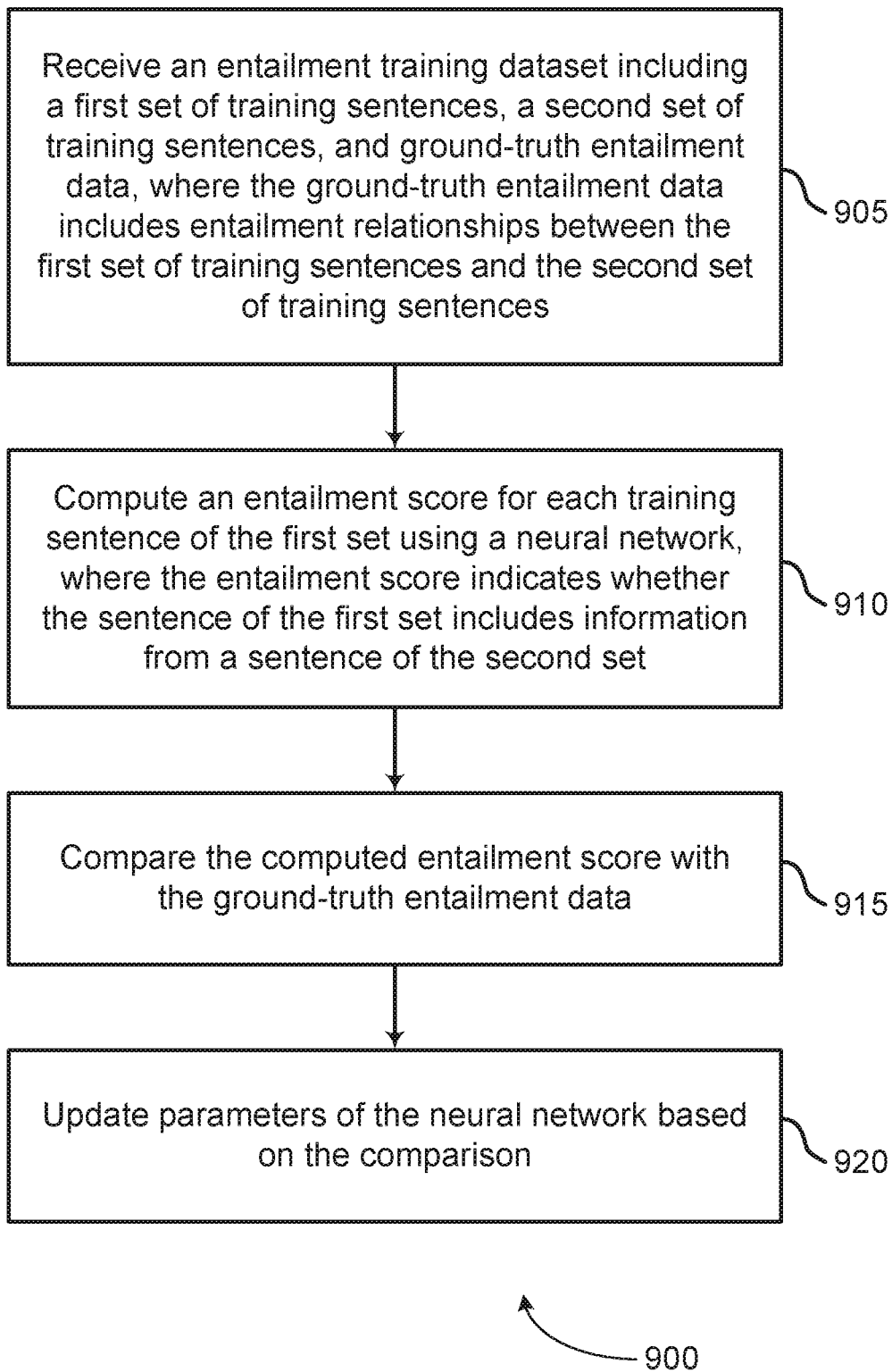
FIG. 9 shows an example of a method for training a neural network to determine entailment scores according to aspects of the present disclosure.

FIG. 9 shows an example of a method 900 for training a neural network to determine entailment scores according to aspects of the present disclosure. In this example, the training of the neural network is performed in a supervised manner with ground-truth data. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system receives an entailment training dataset including a first set of training sentences, a second set of training sentences, and ground-truth entailment data, where the ground-truth entailment data includes entailment relationships between the first set of training sentences and the second set of training sentences. In some cases, the operations of this step refer to, or may be performed by, a training component as described with reference to FIGS. 2 and 11.

At operation 910, the system computes an entailment score for each training sentence of the first set using a neural network, where the entailment score indicates whether the sentence of the first set includes information from a sentence of the second set. In some cases, the operations of this step refer to, or may be performed by, a neural network as described with reference to FIGS. 1, 2, and 4.

At operation 915, the system compares the computed entailment score with the ground-truth entailment data. In some examples, the ground-truth entailment data may include a numeric score for how well a sentence from the first set entails a sentence from the second set. In some examples, the ground-truth entailment data may include a classification rather than a score. In some examples, the ground-truth entailment data labels a relationship between the first sentence and the second sentence as "entailment," "contradiction," "neutral," or similar. In some cases, the operations of this step refer to, or may be performed by, a pruning component as described with reference to FIGS. 2 and 4.

At operation 920, the system updates parameters of the neural network based on the comparison. The system may update the neural network according to a loss which is calculated from the comparison. The loss may be, for example, a cross-entropy loss. In some cases, the operations of this step refer to, or may be performed by, a training component as described with reference to FIGS. 2 and 11.

Figure 10:
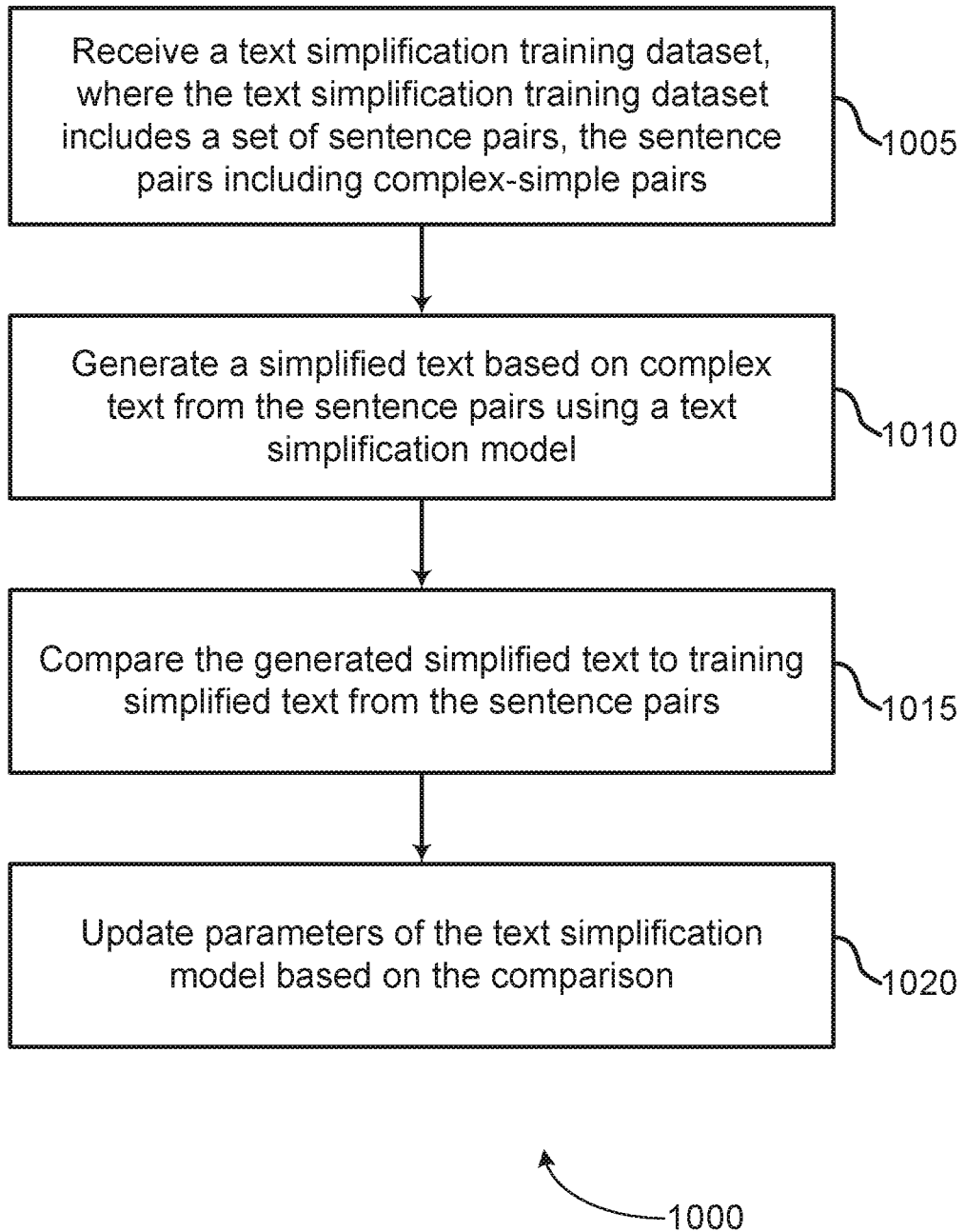
FIG. 10 shows an example of a method for training a text simplification model to simplify text in a supervised manner according to aspects of the present disclosure.

FIG. 10 shows an example of a method 1000 for training a text simplification model to simplify text in a supervised manner according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

There is a lack of domain-specific training data for text simplification models. Accordingly, the text simplification model may be trained in a supervised manner using an out-of-domain or generalized training set. Some embodiments of the model include adjustable parameters for the simplification, such as compression ratio, paraphrasing, and lexical and syntactic complexity. These parameters may correspond to the following properties: character length ratio between source and target sentences (e.g., compression ratio), normalized character-level Levenshtein similarity between source and target sentences (e.g., paraphrasing), ratio of word rank of target and source sentences (e.g., lexical complexity), word rank of a sentence is obtained by taking third-quantile of log-ranks (e.g., inverse frequency order) of all words in a sentence, and ratio of maximum dependency tree depth of source and target sentences (e.g., syntactic complexity). In some cases, these parameters are attached to training data pairs as part of the training data, where the training pairs include the parameters, a complex phrase, and a corresponding simplified phrase. The parameters may be determined based on the words contained the simplified phrase and the complex phrase from the initial training data, and since they are appended to the training data, may cause the model to adjust its predictions at inference time based on similar query parameters.

At operation 1005, the system receives a text simplification training dataset, where the text simplification training dataset includes a set of sentence pairs, the sentence pairs including complex-simple pairs. In some cases, the operations of this step refer to, or may be performed by, a training component as described with reference to FIGS. 2 and 11.

At operation 1010, the system generates a simplified text based on complex text from the sentence pairs using a text simplification model. In some cases, the operations of this step refer to, or may be performed by, a text simplification component as described with reference to FIGS. 2, 4, and 11.

At operation 1015, the system compares the generated simplified text to training simplified text from the sentence pairs.

At operation 1020, the system updates parameters of the text simplification model based on the comparison. For example, the system may calculate a loss, such as a cross-entropy loss, and update the text simplification model based on the calculated loss. In some cases, the operations of this step refer to, or may be performed by, a training component as described with reference to FIGS. 2 and 11.

Figure 11:
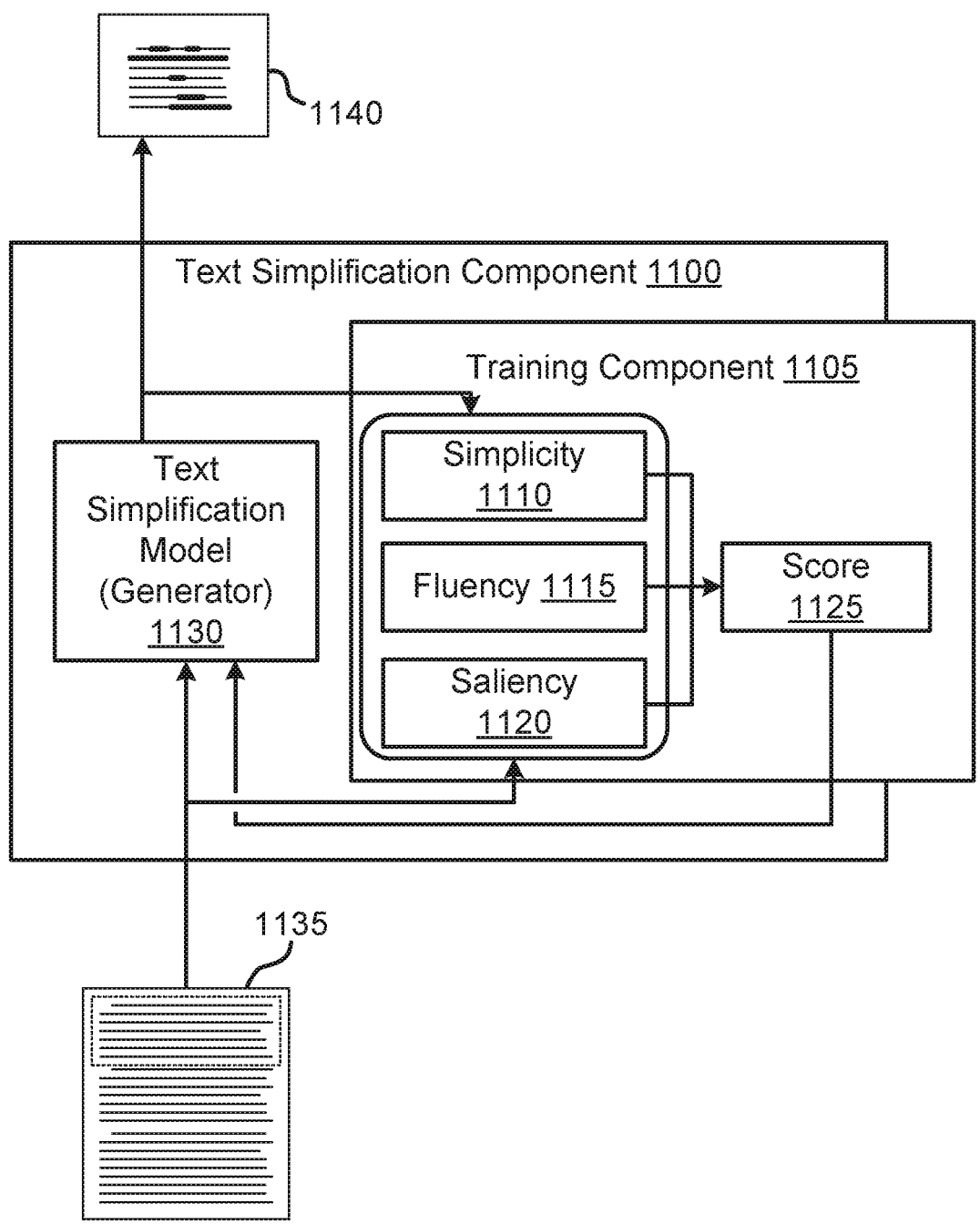
FIG. 11 shows an example pipeline for training a text simplification model in an unsupervised manner according to aspects of the present disclosure.

FIG. 11 shows an example an example pipeline for training a text simplification model in an unsupervised manner according to aspects of the present disclosure. The example shown includes text simplification component 1100, training component 1105, text simplification model 1130, complex text 1135, and simplified text 1140. In this example, training component 1105 includes subcomponents for scoring simplicity 1110, fluency 1115, saliency 1120, and further generates score 1125 based on outputs from the subcomponents.

Text simplification component 1100 is an example of, or includes aspects of, the corresponding element described with reference to FIGS. 2 and 4. Training component 1105 is an example of, or includes aspects of, the corresponding element described with reference to FIG. 2. Complex text 1135 is an example of, or includes aspects of, the corresponding element described with reference to FIGS. 3-5. Simplified text 1140 is an example of, or includes aspects of, the corresponding element described with reference to FIGS. 3 and 4.

In some cases, the unsupervised training generates a sequenced output from an input sequence, and evaluates the generation on metrics such as simplicity, fluency, and saliency. Simplicity may be based on a Fleish-Kincaid Grade Level (FKGL) and word frequency from a large text corpus (which is not used for training, and instead to reference word frequency). Fluency may be based on the perplexity score supplied by a transformer network, such as GPT-2. The saliency score may be determined based off a fill-in-the-blank prediction made by a separate model such as a coverage model. Accordingly, some embodiments of the text simplification model may be trained without complex-simple pairs of training data.

In the example of text simplification component 1100 illustrated in FIG. 11, complex text 1135 is input into text simplification model 1130. Text simplification model 1130 may generate (i.e. "infer") a simplified text based on complex text 1135 though an ANN such as a transformer network. In one example, the text simplification model is implemented by a GPT-2 network.

Then, the output from text simplification model 1130 is supplied to training component 1105. Training component 1105 may include subcomponents for scoring simplicity 1110, fluency 1115, saliency 1120. The subcomponents may each produce scores according to the methods described above, which may be aggregated to produce score 1125. Then, score 1125 is used to update text simplification model 1130. After text simplification component 1100 has been trained such that it produces sufficiently high scores, it may generate simplified text 1140 for use in the text simplification apparatus as described above.

Accordingly, embodiments described herein are able to produce simplified text from a complex text, such that the simplified text contains minimal hallucinations. Embodiments of a text simplification apparatus include a text simplification model for generating simplified text, a neural network for computing entailment scores for sentences in the simplified text, and a pruning component for generating modified text by removing hallucinations and inconsistent information from the simplified text.

Some embodiments of the neural network include a transformer model that is configured to make a determination of whether a generated text entails, e.g., follows from, a source text. In some embodiments, the neural network comprises a Roberta-large model. The neural network may be trained on an entailment training dataset including a first set of training sentences, a second set of training sentences, and ground-truth entailment data, wherein the ground-truth entailment data includes entailment relationships between the first set of training sentences and the second set of training sentences. For example, the ground-truth entailment data may contain human generated labels that describe the relationship between two sentences. The labels may include "entailment," "contradiction," or "neutral", for example. After training, the neural network is then able to determine if one sentence entails another sentence.

In this way, the neural network can compute one or more entailment scores for a sentence from a simplified text, where the simplified text was generated based on a complex text. In some embodiments, the neural network computes a plurality of entailment scores for a given sentence from a simplified text, where each of the plurality of entailment scores corresponds to the simplified sentence's relationship to each of a plurality of sentences from the complex text.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for language processing, comprising:
identifying a simplified text that includes original information from a complex text and additional information that is not in the complex text;
computing an entailment score for each sentence of the simplified text using a neural network, wherein the entailment score indicates whether the sentence of the simplified text includes information from a sentence of the complex text corresponding to the sentence of the simplified text;
generating a modified text based on the entailment score, the simplified text, and the complex text, wherein the modified text includes the original information and excludes the additional information;
computing a first similarity score based on the complex text and the simplified text;
computing a second similarity score based on the complex text and the modified text;
comparing the first similarity score to the second similarity score; and
providing the modified text based on the comparison.

2. The method of claim 1, further comprising:
generating the simplified text based on the complex text using a text simplification model.

3. The method of claim 2, further comprising:
generating an alternative simplified text based on the complex text using an alternative text simplification model; and
generating an alternative modified text based on the alternative simplified text.

4. The method of claim 1, further comprising:
computing a plurality of entailment scores for the sentence of the simplified text, wherein the plurality of entailment scores correspond to a plurality of sentences from the complex text, respectively;
determining whether any of the plurality of entailment scores exceeds an entailment score threshold; and
determining whether to include the sentence of the simplified text in the modified text based on the score determination.

5. The method of claim 1, further comprising:
computing a first hallucination score based on the complex text and the simplified text;
computing a second hallucination score based on the complex text and the modified text;
comparing the first hallucination score to the second hallucination score; and
providing the modified text as an output based on the comparison.

6. The method of claim 5, further comprising:
identifying a first set of entities in the complex text;
identifying a second set of entities in the simplified text;
comparing the first set of entities to the second set of entities; and
computing the first hallucination score based on the comparison.

7. The method of claim 1, further comprising:
dividing the complex text into a first set of sentences; and
dividing the simplified text into a second set of sentences, wherein the entailment score is computed based on the first set of sentences and the second set of sentences.

8. A method for language processing, comprising:
generating a simplified text based on a complex text;
computing an entailment score for each sentence of the simplified text using a neural network, wherein the entailment score indicates whether the sentence of the simplified text includes information from a sentence of the complex text;
filtering sentences of the simplified text based on the entailment score to obtain a modified text;
computing a first hallucination score based on the complex text and the simplified text;
computing a second hallucination score based on the complex text and the modified text;
comparing the first hallucination score to the second hallucination score; and
providing the modified text as an output based on the comparison.

9. The method of claim 8, further comprising:
identifying a first set of entities in the complex text, a second set of entities in the simplified text, and a third set of entities in the modified text;
comparing the first set of entities to the second set of entities to compute the first hallucination score; and
comparing the first set of entities to the third set of entities to compute the second hallucination score.

10. The method of claim 8, further comprising:
generating the simplified text based on the complex text using a text simplification model.

11. The method of claim 10, further comprising:
generating an alternative simplified text based on the complex text using an alternative text simplification model;
generating an alternative modified text based on the alternative simplified text; and
comparing the modified text and the alternative modified text.

12. The method of claim 10, further comprising:
receiving a text simplification training dataset, wherein the text simplification training dataset includes a plurality of sentence pairs; and
updating parameters of the text simplification model based on the text simplification training dataset.

13. The method of claim 8, further comprising:
receiving an entailment training dataset including a first set of training sentences, a second set of training sentences, and ground-truth entailment data, wherein the ground-truth entailment data includes entailment relationships between the first set of training sentences and the second set of training sentences; and updating parameters of the neural network based on the training dataset.

14. The method of claim 8, further comprising:

computing a plurality of entailment scores for the sentence of the simplified text, wherein the plurality of entailment scores correspond to a plurality of sentences from the complex text, respectively;

determining whether any of the plurality of entailment scores exceeds an entailment score threshold; and determining whether to include the sentence of the simplified text in the modified text based on the score determination.

15. An apparatus for language processing, comprising:

a processor;

a memory storing instructions executable by the processor;

a neural network comprising parameters stored in the memory and configured to compute an entailment score for each sentence of a simplified text, wherein the entailment score indicates whether the sentence of the simplified text includes information from a sentence of a complex text corresponding to the sentence of the simplified text;

a pruning component configured to generate a modified text based on the entailment score, the simplified text, and the complex text; and a hallucination scoring component configured to compute a first hallucination score based on the complex text and the simplified text and a second hallucination score based on the complex text and the modified text.

16. The apparatus of claim 15, further comprising:

a text simplification component configured to generate the simplified text based on the complex text, wherein the text simplification component implements one or more text simplification models.

17. The apparatus of claim 15, further comprising:

a hallucination scoring component configured to compute a hallucination score between the complex text and the simplified text.

18. The apparatus of claim 15, further comprising:

a semantic similarity component configured to compute a similarity score between the complex text and the simplified text.

19. The apparatus of claim 15, further comprising:

a user interface configured to receive the complex text and present the modified text and metrics based on the complex text and the modified text.

* * * * *